Dec. 29, 1964    A. B. NOBLE    3,163,096
TYPOGRAPHIC METHOD AND APPARATUS
Filed Dec. 21, 1960    5 Sheets-Sheet 2

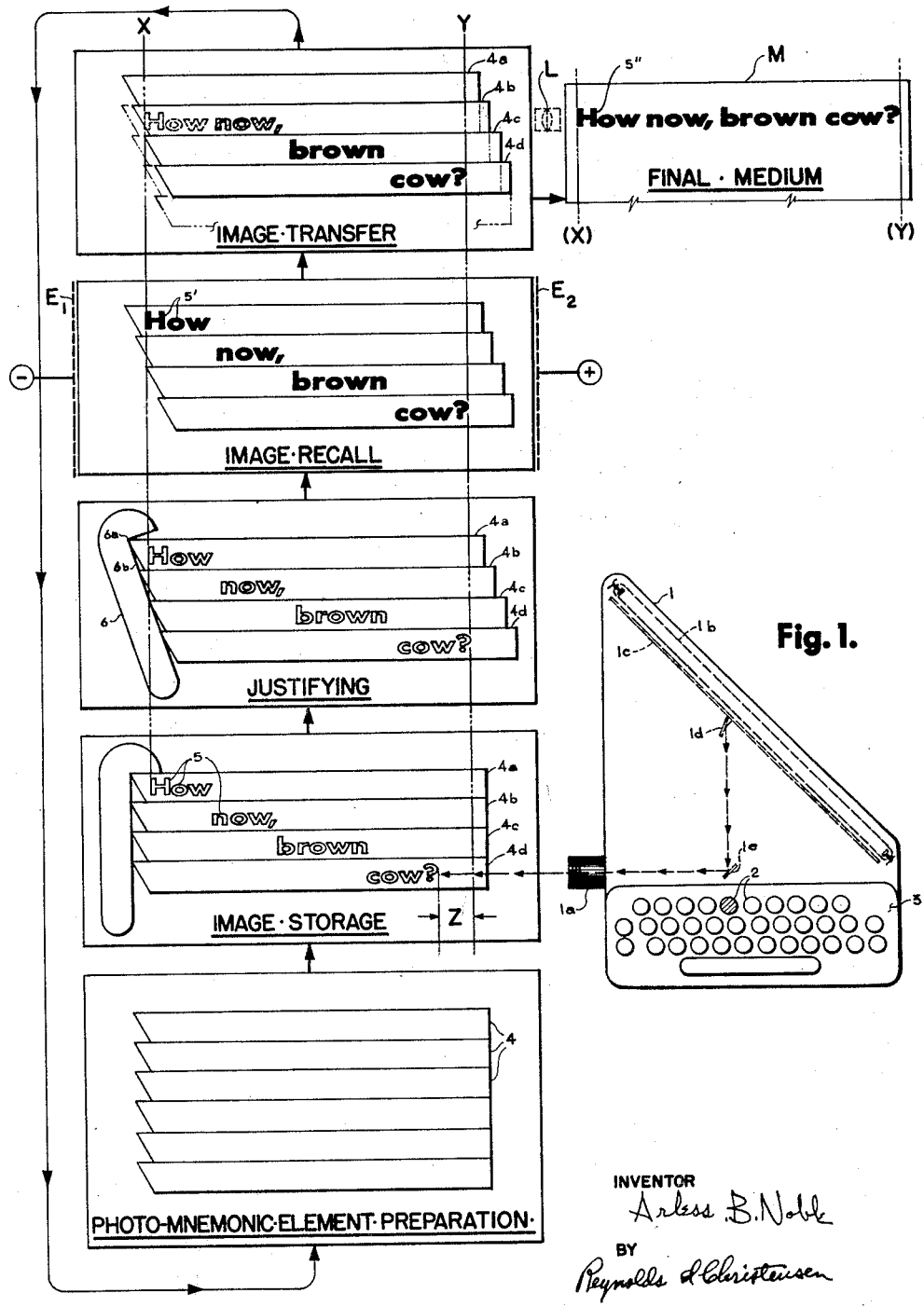

INVENTOR
Arless B. Noble
BY
Reynolds & Christensen

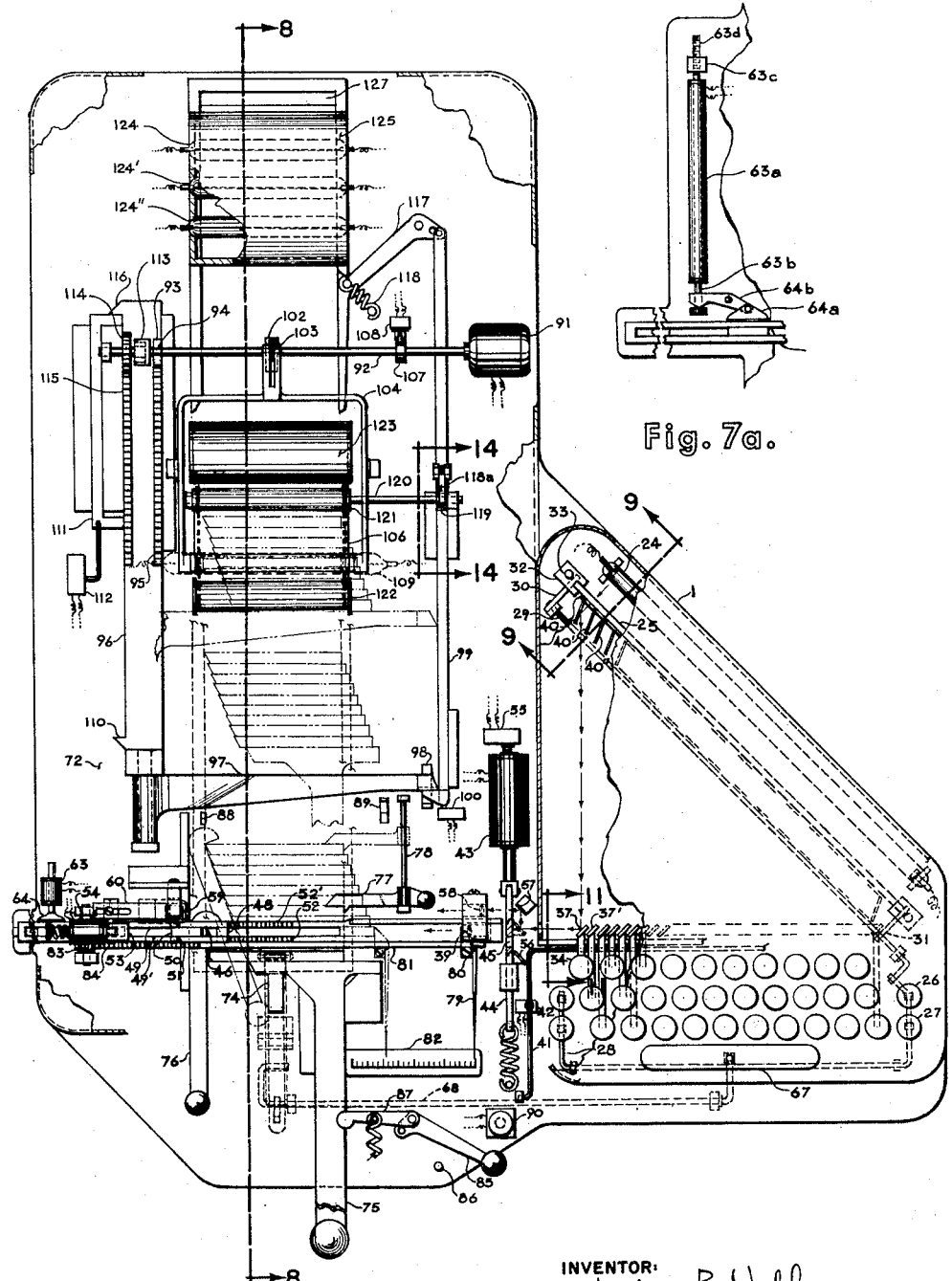

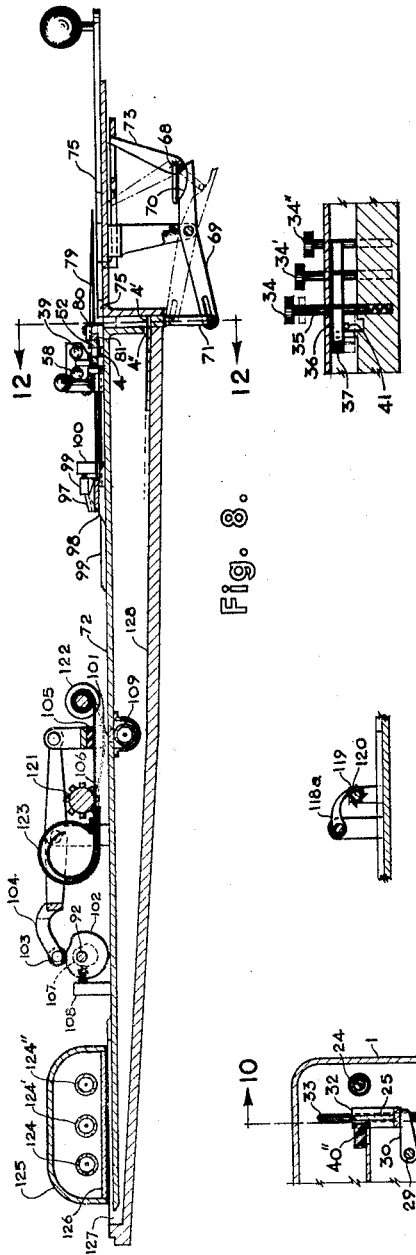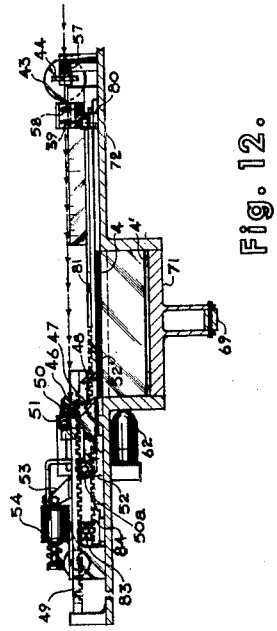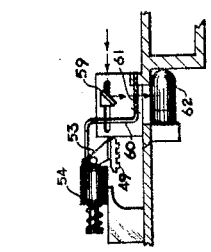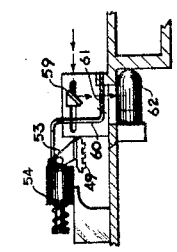

Dec. 29, 1964        A. B. NOBLE        3,163,096

TYPOGRAPHIC METHOD AND APPARATUS

Filed Dec. 21, 1960        5 Sheets-Sheet 5

INVENTOR: Arless B. Noble

BY: Reynolds & Christensen

United States Patent Office 3,163,096
Patented Dec. 29, 1964

3,163,096
TYPOGRAPHIC METHOD AND APPARATUS
Arless B. Noble, Berkeley, Calif.
(202 W. 35th St., Shawnee, Okla.)
Filed Dec. 21, 1960, Ser. No. 77,309
6 Claims. (Cl. 95—4.5)

This invention relates to improvements in the art of typography and more particularly concerns a new and improved method and apparatus for producing justified typographical line images. The invention is herein illustratively described by reference to the presently preferred embodiments thereof; however, it will be recognized that certain modifications and changes therein with respect to details may be made without departing from the essential or characterizing features involved.

Prior methods of typography generally involved complex and expensive apparatus, the operation of which was quite time consuming. In one previous system by which justified print was composed, a rough copy was prepared wherein the lines of print were formed without adjusting the word spacing, whereupon the deficit or shortage of each line with relation to the desired column width was noted and marked alongside each individual line. From this information, a second or finished copy was prepared utilizing the line deficit notations to make the necessary justification. Thus it was necessary to make two complete settings of the copy. Such a system was used primarily in certain devices capable of producing what is known as "cold type" in the form of impressions made through carbon paper, ribbon, etc. It was considered suitable for many applications but generally inferior in quality to reproduction proofs pulled from metal type or photo-composition.

The second technique heretofore used involved photocomposing machines wherein coded information was stored, usually by a binary code system, on perforated paper tape, magnetic records, etc., as a means of automatically controlling justification by the machine.

The present invention simplifies and expedites the preparation of justified typographical line images by a process of directly storing and subsequently recalling the typographical line images themselves from which the final or finished print is to be prepared. With this improved method, only a single setting of the type or print is necessary and there is no need for codification and associated read-out nor for computing apparatus such as has generally been used in the past to operate a type or character projecting apparatus which produces the finished typography.

In the preferred form of the invention, individual word images are formed by projecting the letter images by actinic light onto a photomnemonic element, i.e., an element capable of forming and temporarily retaining this image as a recallable impression in the element, each such element storing a separate word. With all of the elements thus impressed with stored images, which are required to make up a line of print, the elements are shifted appropriately in order to space apart the words and attain the desired justified line length, whereupon stimulation of the elements recalls the images for transfer thereof in justified line composition form onto a permanent retaining medium. The justification may take place by shifting the elements to be moved either simultaneously or in sequence, and either prior to or in connection with the image transfer operation. In some cases, the images may be stored on separate photomnemonic elements, as in the preferred embodiment, whereas in others the word images making up an entire line composition of print may be formed on a single large photomnemonic element, with suitable means provided for shifting or distorting the photomnemonic medium as necessary in order to displace the word images relatively for line justification prior to or in connection with transfer of the word images onto the final medium.

In a special form of the invention, the word images are initially aligned on a photomnemonic medium which is elastically flexible to permit stretching or compressing the same along its length in order to vary the composition line length. Alternatively, the storage medium may consist of aligned character or word-retaining rigid portions interspaced by elastically flexible portions permitting shortening or lengthening of the line by varying the word spacing.

These and other features, objects and advantages of the invention will become more fully evident from the following description thereof by reference to the accompanying drawings.

FIGURE 1 is a simplified and partially schematic diagram illustrating apparatus and the preferred method of the invention in which the photomnemonic medium comprises separate relatively displaceable photomnemonic elements adapted to store the individual word images.

FIGURE 7 is a plan view of apparatus implementing the arrangement of FIGURE 1, and FIGURE 7A is a fragmentary detail thereof showing an alternative brake device.

FIGURE 8 is a longitudinal sectional view taken on line 8—8 in FIGURE 7.

FIGURE 9 is a detailed fragmentary sectional view taken on line 9—9 in FIGURE 1, showing the means for changing the case of letters.

FIGURE 10 is a detailed fragmentary sectional view taken on line 10—10 in FIGURE 9.

FIGURE 11 is a transverse sectional view of the projector keyboard, taken on line 11—11 in FIGURE 7.

FIGURE 12 is a transverse sectional view taken on line 12—12 in FIGURE 8 to show escapement mechanism for character indexing.

FIGURE 13 is a view similar to FIGURE 12 but with parts broken away to show photoelectric apparatus controlling the character indexing.

FIGURE 14 is a detail of the ratchet and pawl mechanism controlling advance of a film strip as the final medium.

Figure 3:
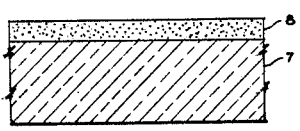
FIGURES 3, 4, 5 and 6 are cross sections through different forms of photomnemonic elements which may be used in connection with the invention.

Referring to the drawings, the novel method in its illustrated form involves use of a projector apparatus 1 by which typographical images are photographically projected through a lens system 1a in a successive order onto a photomnemonic medium comprising a series of parallel photomnemonic elements 4. The projector 1 comprises an actinic light source 1b such as a mercury vapor lamp which illuminates a photomatrix 1c including the letters of the alphabet and other required symbols and characters, each associated with individual selector keys 2 as in a typewriter. Associated with each individual type key 2 mounted on a keyboard 3 is a set of mirrors 1d and 1e so arranged as to be operatively positioned for projecting light into the lens system 1a and onto the medium 4 from the particular typographic character which is selected from the photomatrix 1c by actuation of a type key. The length of the light path which is traversed from the particular character selected from the photomatrix 1c to the lens system 1a is made uniform by so mounting the two mirrors 1d and 1e associated with each individual key 2 that all of the mirrors 1e in their operative position will lie in a common plane (parallel to the matrix) and all of the mirrors 1d in their operative position will lie in a common plane (aligned with the lens system), and with the cooperative mirrors in each set arranged so that the reflected light which travels between the two mirrors propagates in a line disposed at right angles to the reflected light which travels from the mirror through the lens system 1a. The line of mirrors 1d and the photomatrix both lie at 45 degrees to the line of mirrors 1e.

In other respects the image projector 1 may incorporate mechanical features and arrangements which are generally similar to typewriter mechanism, including the feature of shifting either the lens system, the entire carriage or the photomnemonic element support (not shown) by one letter increment or spacing on completing each type key actuation, so as to space the letter images uniformly along the photomnemonic elements upon which they are projected. Further, the mechanism will include suitable carriage return features or the like as well as features for producing capital letters, punctuation marks, numerals, etc., all carried in the photomatrix 1c, according to well understood principles.

The photomnemonic medium 4, comprising the plurality of individual photomnemonic strips or elements as shown, is depicted in the illustration in FIGURE 1 as progressing through a succession of process stages or steps commencing with the step of "image storage." In this initial step of the method, the first of the series of elements, designated 4a, is aligned with the lens system 1a of the projector 1 with the succeeding elements 4b, 4c and 4d, etc., being positioned in superposed parallel registry therewith. The first word of the proposed line composition is impressed on the first element 4a by operating the appropriate keys 2. The word image is thus stored by element 4a due to the photochemical energy exchange properties of the medium. The first word in the example, stored on the element 4a, is the word "How."

After the first word is formed, relative movement is effected between the series of photomnemonic elements 4a, 4b, 4c, etc., and the line of projection of light from the projector 1, so as to place the second photomnemonic element 4b in alignment with the projector field, whereupon the second word is formed on the second photomnemonic element 4b by suitable operation of the projector keys 2. It will be noted that the first letter of the second word commences just immediately to the right of the last letter of the first word and that in the illustration no spacing is provided longitudinally of the elements between the two words. However, if desired, a single letter space may be allowed between words by operating a spacer key on the projector 1. In the same manner, the third, fourth and any succeeding words may be impressed on the succeeding photomnemonic elements, each commencing just to the right of the respectively preceding words, to complete the proposed line of type. The result is as indicated in the block labeled "Image Storage" in FIGURE 1, wherein the word images 5 are shown in open or unshaded letters to indicate the fact that these images are latent or being stored preparatory to recall.

In the illustrated succeeding stage, designated "Justifying," according to this illustrated embodiment of the invention, the individual photomnemonic elements 4a, 4b, 4c, etc., bearing the respective word images are displaced longitudinally in relation to each other in order to space out the words and place the last character image at the desired right hand column margin line y while the first word remains indexed to the left hand column margin line x. In this way, the line length deficit z is made up.

Such a result is effected in the preferred manner by employing a justifying bar 6 which pivots about an axis 6a coinciding with the upper left hand point or tip of the first photomnemonic element 4a and which has a reference edge 6b adapted to bear against the corresponding tips or corners of the succeeding photomnemonic elements as the bar is swung in a counter-clockwise direction. To permit the bar 6 to engage the elements properly for displacement purposes the left end of each element forms an acute angle with the upper or leading edge. Reference edge 6b is linear and is initially positioned substantially perpendicularly to the length of the parallel elements 4a, 4b, 4c, etc., as shown in the image storage block in the diagram. By swinging the bar 6 in the manner illustrated in FIGURE 1 in the "Justifying" position, until the end of the last word image, which terminates in this instance by the question mark, is appropriately aligned with the right hand column line y, the intervening word images will be automatically uniformly spaced from each other between the first and last word images in the line composition. This step of justification preferably precedes the succeeding steps of image recall and image transfer although, as will appear, justification may occur in other ways within the broader aspects of the invention.

In the succeeding illustrated stage of "Image Recall" the photomnemonic medium or elements bearing the latent word images are stimulated or activated in such a manner as to recall the images and thus render them capable of being photographed for transfer onto a permanent retaining medium. In the illustration, this activation or recall is shown symbolically as being effected by means of electric fields applied through condenser plates $E_1$ and $E_2$ which in practice would be placed over and under the photomnemonic strips or would comprise conductive layers in the strips themselves so as to subject the photomnemonic surface thereof to an electric field gradient which is capable of causing the strips to luminesce. Thus stimulated, the photomnemonic medium is advanced to the semi-final stage of the process wherein the recalled images are now transferred to the final medium M by a photographic process utilizing either direct contact printing or a camera or lens system L operated recurringly as each of the successive elements 4a, 4b, and 4c in turn are advanced past the established location for photographic reproduction onto the medium M. Inasmuch as the lens system L remains stationary and the camera is operated recurringly as each of the strips 4a, 4b, 4c, etc., comes into registry therewith, the resulting image record on the final medium M is a straight line of justified typographical print which upon development of the photographic medium becomes a permanent print or record of the desired justified line composition.

In the diagram, the latent images are shown with open letters, whereas the recalled images are shown in solid or filled-in letters. As illustrated in the image transfer stage by shade lines, some of the first formed words may begin to fade out while the later formed words are being photographed for final reproduction. However, it will be recognized that the period of time during which the word images will glow visibly or for reproduction purposes after being recalled may vary depending upon the different types of photomnemonic compositions used and the method of stimulation for recall purposes.

The final stage in the overall process is represented as the photomnemonic preparation stage wherein the energy state of the photomnemonic surface of the elements 4 is returned to the initial condition by erasing in effect any residual image impressions thereon. In this way, the photomnemonic elements may be used repeatedly in an endless manner and will have a substantially indefinite life.

It will be recognized that the usual method of reproducing or transferring the reactivated or recalled type images will be a photographic method. However, xerographic methods may also be used, as will later appear herein.

It will be seen that the system illustrated in FIGURE 1 employs a separate photomnemonic element for each individual word in a line composition. It will be recognized, however, that a single large photomnemonic element equivalent to the joining together of the individual elements 4a, 4b, 4c, 4d, etc., may be employed whereon all of the separate word images making up a desired line are stored as in the illustration in FIGURE 1 and the required displacements between the words in that instance would be obtained by lateral motion of the single large element during the image transfer stage itself. In that event, as each word in the proposed line of type is photographed or otherwise transferred onto the final medium, the photomnemonic medium would be displaced by the required word interval or spacing preparatory to transferring the next succeeding word.

Figure 2:
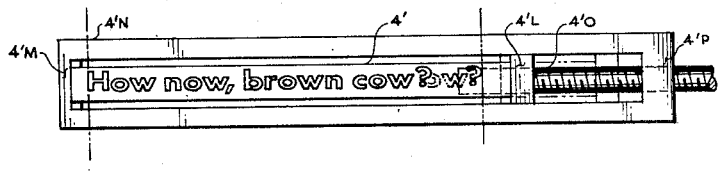
FIGURE 2 is a simplified diagram showing a unitary photomnemonic medium on which an entire line composition of type images may be stored and justified prior to image transfer for reproduction.
Figure 2A:

In FIGURE 2, still another means of justification is illustrated. In this instance, the photomnemonic element 4' comprises an elongated strip whereon all of the words of a proposed line of type are impressed by actinic light images as in the illustration in FIGURE 1. In this instance, the medium 4' is elastically flexible and may be compressed or expanded by means of the movable end plate 4'L secured to the right-hand end of the medium 4', with the left hand end thereof secured to the adjacent end 4'M of the rack 4'N. The movable end plate 4'L is carried by a traversing screw 4'O which is threaded in the right hand end 4'P of such rack, whereby turning of the screw causes the plate 4'L to move lengthwise of the rack and thereby stretch or compress the medium or strip 4' in order to vary the length of the line of words as required. Alternatively, as shown in FIGURE 2a, the medium 4' may comprise inflexible letter blocks 4'' interconnected by resiliently elastic spacers 4''', such that the word spacing is changed when the plate 4'L is moved back and forth but the words themselves are not stretched, compressed or otherwise distorted.

Referring to FIGURES 3 to 6, inclusive, perhaps the simplest photomnemonic medium from the standpoint of fabrication and use, and the one presently preferred, is that illustrated in FIGURE 3. This element comprises a transparent support or base 7 upon which a phosphor layer 8 is coated. While any of the common phosphors may be used for the layer 8, most would necessitate a suitable means of exposure compensation allowing for the exponential decay of phosphorescent emission following excitation in order to recall the type images, unless, of course, the recall is performed in conjunction with the step of image transfer and not prior thereto. However, in order to permit stimulating all of the letter images at the same time and subsequently transferring them to a permanent medium as by a photographic technique without appreciable variation in the light intensity which emanates from the individual images, it is possible to use phosphors of the type referred to as "Lenard phosphors," "infrared-sensitive" phosphors or "infrared-stimulable" phosphors. In these phosphors, the rate of phosphorescent light emission is greatly increased by irradiation with infrared light (i.e., stimulation). Thus the energy in the image may be stored for relatively long periods and released by infrared irradiation during the image transfer stage in the present method. Moreover, a number of phosphors of this general type have been developed for purposes of infrared detection, some of which have a very long unstimulated decay and which are very sensitive to infrared stimulation. Strontium sulfide type phosphors activated with minute traces of cerium and samarium are examples of the latter.

Figure 4:
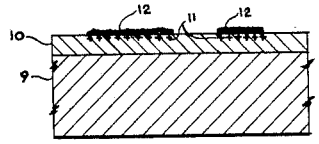

FIGURE 4 is a cross section of a modified photomnemonic element of the so-called xerographic type by which offset-lithographic printing plates may be prepared directly. The element in this case comprises a conductive base 9, supporting a photo-conductive layer 10. In use, the surface of the photo-conductive layer is first given an electric charge, as by passing it through a high voltage field, and the charged surface is then exposed to the projected image. The light regions of the projected image cause the photoconductive layer to become conductive and thereby lose charge to the conductive base 9. The resulting pattern of charge 11 residual in the layer 10 represents the desired image to be stored. This image can be recalled by dusting the surface with a finely divided pigment such as carbon 12, which will adhere to the areas retaining the electric charge but not to the areas in which the charge has leaked off. This pigment is then transferred to a support by means of an electric field as is well-known in the art of xerography. Suitable pigments are available which can be used to form an ink-receptive image when transferred to a lithographic plate. In using the element shown in FIGURE 4, the step of photomnemonic preparation which precedes the projection of the images onto the photomnemonic medium is that of applying the charge to the conductive layer 10. The step of justifying, following image storage, would take place as before, whereas the step of image recall would be that in which the finely divided pigment is dusted onto the surface in order to produce visible word images thereon. Following this, the resulting word images may be photographed, fixed or otherwise made permanent or transferred to a final medium, depending upon the desired technique.

Figure 5:
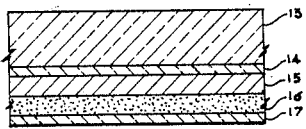

In FIGURE 5 there is shown still another type of element which may be used, particularly when a bright image is required. This type of element employs luminous feedback from an electroluminescent phosphor, thereby to maintain conduction in a photo-conductive layer which maintains emission in the phosphor. The element comprises a transparent support 13, a transparent conductive layer 14 serving as one electrode, a photo-conductive layer 15, an electroluminescent layer 16, and a second transparent conductive layer 17 which serves as a second electrode. The first electrode may comprise tin oxide or sputtered metal, for example. The function of this composite is as follows: the image is first projected onto the photo-conductive layer 15, rendering it conductive in the light or illuminated regions of the image. A pulsating direct voltage is then impressed upon the two transparent layers 14 and 17, as electrodes, causing conduction of current to the interface between the photoconductor and phosphor layers 15 and 16 in regions wherein the photoconductor has been made conductive by the light pattern of the projected image, thereby causing the electroluminescent layer 16 to glow in such areas. The resulting light emanating from the glowing areas feeds back from the phosphor layer 16, and maintains photo-conductivity in the photo-conductive layer 15 after the projection is terminated, and results in prolonged image retention in the phosphor lattice. Following the step of image transfer in the process of the invention, the residual image is extinguished in the photo-luminous layer by interrupting the vloltage applied to the electrode layers. This latter step, of course, represents the photomnemonic element preparation stage shown in FIGURE 1.

With the type of elements depicted in FIGURE 5 and described above, it is preferred that the phosphor layer be minutely reticulated, preferably with matching reticulation in the photo-conductor, and with an opaque substance filling the interstices. The opaque material shields adjacent phosphor cells from one another and thereby prevents the spreading of the image which can otherwise occur due to the diffusion of light in the process of feedback because of the finite thickness of the phosphor layer.

Figure 6:
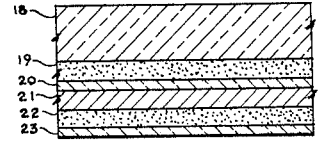

In FIGURE 6 there is illustrated a modification wherein a transparent support 18 carries an infrared-sensitive phosphor layer 19. On this layer 19 is applied an electrode layer 20, covered by a photo-conductive layer 21. An electroluminescent phosphor layer 22 is applied to the layer 21 and is covered by another transparent electrode layer 23. An image projected by means of actinic light through the transparent support 18 onto the infrared-sensitive layer 19 produces a latent image in the latter which is retained through the operation or step of justification. Recall of this image is effected by irradiation of the element with infrared (stimulating) radiation simultaneously with the application of an electrical potential across the two transparent electrodes 20 and 23. Emission of light from the infrared-sensitive phosphor layer impinges upon the photo-conductive layer rendering it conductive in the light image areas and resulting in a bright emission (visible) in the corresponding areas of the electroluminescent phosphor layer. In some cases, the two separate functional phosphor layers may be combined into a single phosphor layer inasmuch as certain phosphors exhibit the properties of both electroluminescence and infrared stimulability. The advantage of this embodiment of the invention over the preceding embodiment is that the image is stored without the use of feedback and attendant spread or loss of definition due to light diffusion. Moreover, it is not necessary to maintain the applied voltage during the justification and subsequent steps of the overall process, inasmuch as in most instances the transfer of the image to the final medium can be effected by application of a brief electrical impulse to the electrodes. In case the final medium is relatively insensitive, as in the case of an offset plate, for example, an additional layer of opaque substance may be incorporated between the photo-conductive layer 21 and the phosphor layer 22 in order to prevent luminous feedback, in which case the infrared stimulation is applied in a gradually increasing manner to prolong the recalled image retention.

One apparatus embodying the method of this invention in its form depicted in FIGURE 1 is shown in some detail in FIGURES 7 through 16. This apparatus would be suitable for use by commercial printers who require versatility in their equipment.

For convenience in presentation and ease of understanding the apparatus may be viewed as comprising a projector assembly, a character indexing assembly (wherein justification occurs) and an image transfer assembly (wherein elements are also prepared for recycling). The projector assembly 1 is found at the lower right-hand area of the plan view of the apparatus depicted in FIGURE 7; detail views are shown in FIGURES 9, 10 and 11.

A tubular source of actinic light 24 (such as a mercury vapor lamp) illuminates a photomatrix 25 consisting of a transparent support bearing a stencil or image layer containing the images 38, 38', etc., of the characters corresponding to a font of type, said being arranged as shown in FIGURE 10. Because more characters are employed in typography than normally appear on a typewriter, two case shifts are employed which are actuated by two keys at either end of the keyboard, indicated by 26 and 27. These two case shifts are arranged so as to depress the lever shaft 28 by differing amounts so as to produce differing degrees of rotation of shaft 29, to the respective ends of which are attached fingers 30, 31. The shaft is connected to impart motion to matrix carriage 32 constrained to move vertically by guide pins 33 at opposite ends thereof. In this way the operator may, by depressing shift key 26, raise the matrix to bring the row of upper-case characters into position for projection, or by depressing shift key 27 bring a row of characters containing numbers, ligatures, etc. into position.

This system may, of course, be extended to additional rows if it is desired to include subscripts and superscripts, small capitals, mathematical symbols, etc.

In order to select a character from the photomatrix each character key such as 34 is attached to the upper end of a pin such as 35 from which extends an arm such as 36 which carries a small reflector mirror such as 37. Thus it can be seen that depressing one of the character keys lowers one of a series of small reflectors 37, 37', etc. into a position in which it will deflect the optical path of rays emanating from one of the character images, such as 38, through a right angle and into optical alignment with projecting lens 39. It will be seen that the matrix 25 is disposed at an angle of 45 degrees to the row of reflectors 37, 37', etc. This arrangement maintains an equal optical distance from the projecting lens 39 to any character image on the matrix. A series of reflectors such as 40, 40', etc. are located in front of the matrix 25 and so oriented as to produce a 45 degree deviation in the ray path for the purpose of normalizing the same.

Figure 15:
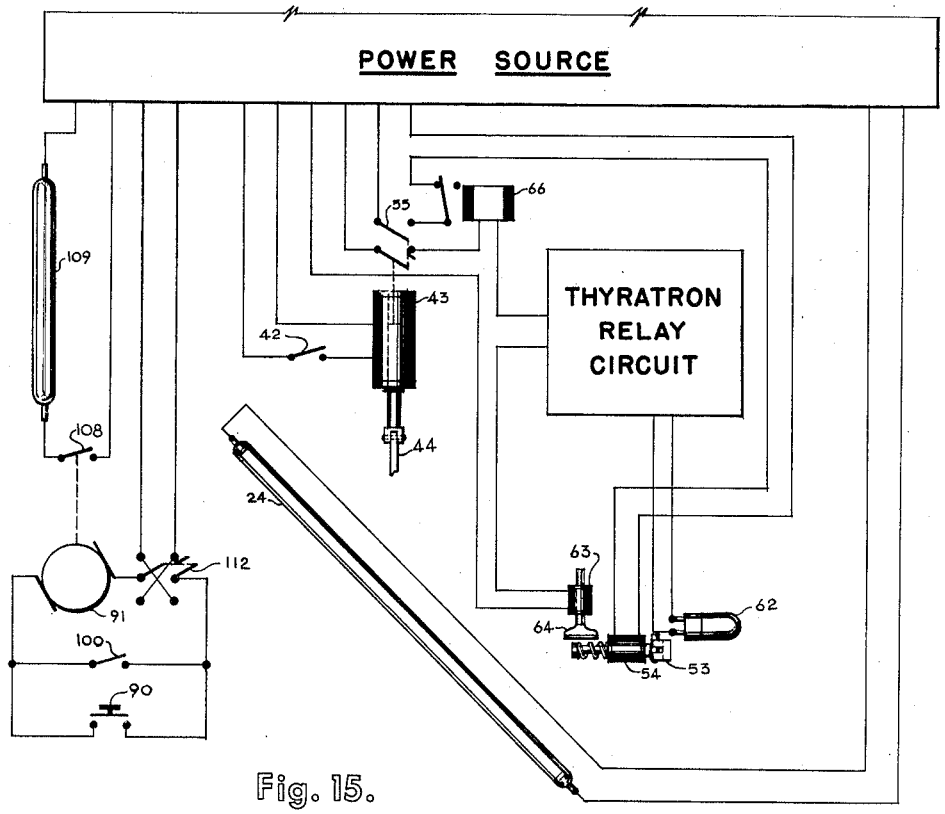
FIGURE 15 is a schematic diagram of an electrical system for the apparatus of FIGURES 7 et seq.
Figure 16:
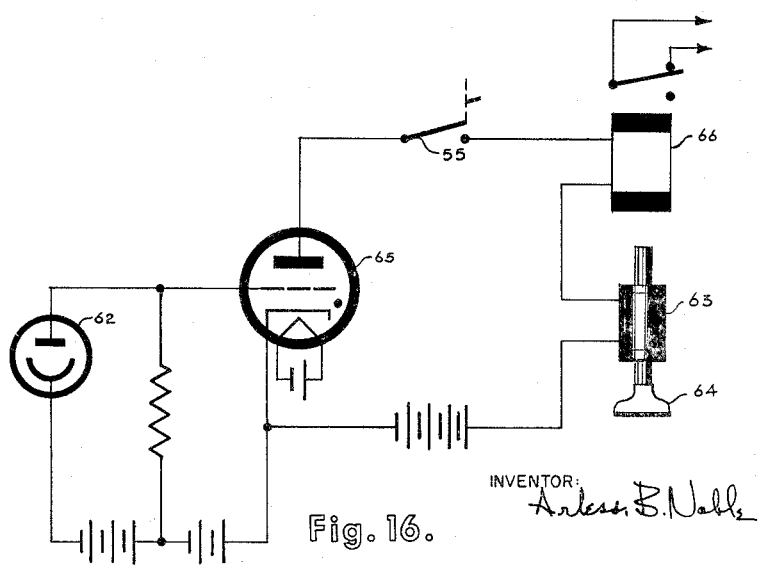
FIGURE 16 is a simplified schematic diagram of a thyratron relay circuit for photoelectric control of character indexing.

The character indexing assembly is found in the portion of FIGURE 7 to the left of the projector assembly, at the right in FIGURE 8, and in FIGURES 12 and 13. Diagrams of the electrical circuits involved are shown in FIGURES 15 and 16. When a key such as 34 is depressed it will be seen that the arm 36 engages the switch bar 41 which results in closing a switch 42 and thereby energizing a solenoid 43 (refer to FIGURES 7, 11 and 15). The action of solenoid 43 moves shutter 44 so as to open an aperture 45 in the optical path associated with lens 39, allowing light emanating from a character, say 38, and reflected by reflectors 40 and 37 to pass briefly through the lens 39. This impresses an actinic light image of the character on the photomnemonic element 4 after the light being reflected successively by two distance compensating mirrors 46 and 47 and indexing mirror 48. In this way the image of a single typographical character is exposed upon the photomnemonic element. The indexing of reflector 48 shifts the optical path so that successive characters may be projected onto successive positions along the surface of the photomnemonic element 4.

To maintain sharp focus of the successive images it is necessary that the optical distance from the lens 39 to the image plane on the surface of element 4 remain constant. This is accomplished by the combination of the movable racks 49 supporting indexing reflector 48, the movable support 50 carrying the two compensating reflectors 46 and 47, the rollers 51 which constrain support 50, the pinions 50a which drive movable support 50, and the stationary racks 52. An examination of FIGURE 12 will reveal that if racks 49 carrying reflector 48 move through a given distance, the motion of the pinions 50a will be such as to drive movable support 50 through one-half that distance with the result that the decrease in optical distance provided by the motion of support 50 exactly offsets the increase which would be due to the motion of reflector 48 had the support 50 remained stationary.

The motion of racks 49 is imparted by a toggle-acting clutch pad 53 attached to the armature of solenoid 54. This motion is controlled photoelectrically in the following manner: When the armature of solenoid 43 is fully actuated it closes switch 55 while bringing the aperture 45 into alignment with lens 58. Simultaneously, reflector 56, which is attached to the shutter 44, is moved into the path of rays emanating from the image on the matrix resulting in the deflection of those rays to reflector 57 which directs them through the aperture 45 to the lens 58 which focuses them in the plane of aperture 61 in vane 60 after a downward reflection by reflector 59. After passing through aperture 61 the rays impinge upon the cathode of a photocell 62. It will be seen that the vane 60 is attached to the armature of solenoid 54 so that a strike of the armature of the solenoid imparts a corresponding motion to both the vane and the movable racks 49, except that the toggle action of the clutch pad 53 allows the racks 49 to retain the displacement upon the return stroke of the solenoid 54. When the vane 60 has moved a sufficient distance, the edge of the aperture 61 will occlude the image of the character thus shutting off the rays reaching the photocell. This results in the simultaneous deenergizing of solenoid 54 and the braking of the motion of the racks 49, as will be explained in the following paragraph.

The photoelectric control of character indexing can be understood by reference to FIGURE 15. When the switch 55 is closed by the action of solenoid 43 it simultaneously energizes solenoid 54 and the plate circuit of a thyratron relay circuit indicated by the block labeled such in FIGURE 15. A typical circuit of this type is shown in FIGURE 16 (although amplification of the signal from the photocell 62 would be desirable in practice, the circuit shown is sufficient for illustration). At the beginning of the stroke of solenoid 54 the position of the aperture 61 allows light to reach photocell 62 rendering it conductive, with the result that the control grid of the thyratron tube 65 is then sufficiently negative to prevent firing of the tube. When the aperture 61 has traveled the width of the projected character image the light from same reaching the photocell is occluded rendering the photocell non-conducting which allows the control grid to become relatively more positive causing the thyratron tube to fire. This event simultaneously energizes the relay 66, which interrupts power to solenoid 54, and the solenoid 63 which actuates the brake 64 to prevent overshoot of the moving racks 49 of the optical indexing escapement. When the operator releases the key, switch 42 is opened which deenergizes solenoid 43 and opens switch 55, thereby interrupting power to the thyratron plate circuit, and preparing the apparatus for the selection of the next character.

FIGURE 7A shows use of a magnetostriction type brake which may be preferred over the solenoid type shown in FIGURE 7 because of the faster response of a magnetostriction element. This alternative form of brake comprises the magnetostriction rod 63b and magnetizing coil 63a surrounding the rod. The rod has a constraint or stop 63c threaded on the threaded end 63d of the rod to permit adjustment of brake drag. A reversing lever 64b permits the rod to be of a material which contracts when magnetized. The better materials are of this type. A nickel rod from ten to twenty inches long will provide sufficient motion to serve the purpose. When the rod contracts the lever is swung slightly to apply the brake shoe 64a, as desired.

In the apparatus of this embodiment successive words are stored on successive photomnemonic elements. This necessitates some means of indexing these elements between words. A linkage is provided for this purpose. Thus, when the space bar 67 is depressed the shaft 68 rotates, one end of which is bent to form a crank engaging lever 69. The shape of lever 69 is such that motion is imparted to it only during a part of the motion of the crank end of shaft 68 by virtue of arc 70 having a radius of curvature equal to that of the crank radius. The motion imparted to lever 69 is just sufficient to cause it to raise elevating member 71 to a position where its upper surface is flush with the surface of the machine base 72 thus elevating a photomnemonic element 4′ to that level. As the rotation of the shaft 68 continues it brings the attached finger 73 into engagement with member 74 which in turn imparts sufficient motion to plunger 75 to cause it to push the photomnemonic element 4′ into position under the image indexing escapement.

As the characters comprising successive words are stored on successive photomnemonic elements they are successively displaced in the direction of the top of FIGURE 7. It can be seen that as this occurs the justifying stick 76 is carried along as is the rider 77 which slides on shaft 78. While this is occurring the pointer 79, attached to changeable stop 80 on the bar 81, is being moved along scale 82, said motion being imparted by the engagement of rack 49 with pinion 83 which in turn engages rack 84, a part of bar 81. When the operator judges from the position of the pointer 79 that sufficient characters have been set for a given line he moves lever 85 against stop 86. This action moves plunger 75 into contact with the photomnemonic element (then in position under the escapement) by means of member 87. While holding lever 85 in this position he moves the justifying stick 76 to the right to a position such as that indicated by the ghost lines. This action accomplishes the justification by moving the element under the escapement to the right until it encounters the stop 80, the position of which corresponds to the line deficit, while leaving the element storing the first word of the line unmoved and moving the intervening elements proportionately. This has the effect when the images are transferred of adding space to the interword spaces to fill out the line to the desired column width. Next the operator pushes the plunger 75 forward carrying the series of photomnemonic elements to the position indicated by the ghost lines. As this occurs the justifying stick 76 and the rider 77 are lifted clear of the elements by ramps 88 and 89 respectively. This places the series of elements in position for pick-up by the image transfer assembly which functions automatically. It is then necessary to return the escapement, the justifying stick and the rider to their initial positions. These operations are done manually on the apparatus shown but of course might be done automatically by the addition of suitable actuators of an obvious nature.

To initiate the image recall and image transfer operations the operator depresses switch 90 momentarily which energizes the motor 91 causing shaft 92 to rotate the attached one-tooth pinion 93 having a single tooth 94 which engages the rack 95 in a manner that produces a displacement of the rack of only one tooth pitch distance per revolution of the shaft 92. This results in an intermittent motion of the member 96 containing the rack and carrying with it the swivel arm 97 which descends the ramp 98 to the surface of the machine base 72 and engages the series of photomnemonic elements imparting motion to same. Once this motion has begun the operator may release switch 90 because the motion of the swivel arm 97 permits movement of member 99 allowing switch 100 which is of the normally closed type to close and bypass switch 90.

The proportions of the one-tooth gear 93 and the pitch of the rack 95 are such that the intermittent motions imparted to the swivel arm are exactly sufficient to produce a series of displacements in the group of photomnemonic elements equal to the width of one such element. Thus, as the motion continues, each of the group of elements is successively positioned over the infrared window 101 which is composed of a material which transmits infrared (stimulating) radiation but which filters out visible and other radiation. Each element is so positioned during a substantial portion of the period of rotation of the shaft 92. During each such interval, the rotation of cam 102 attached to shaft 92 engages cam follower 103 to actuate rocker 104 which lowers the pressure pad 105 which presses a photographic film or other sensitized medium (final image supporting medium) 106 into contact with the surface of the photomnemonic element then in position over the infrared window 101. Also during the interval, the motion of cam 107 closes cam-switch 108 which energizes the infrared source lamp 109 (see circuit diagram in FIGURE 15), the radiation from which passes through the infrared window 101 and impinges upon the photomnemonic element above it and stimulates the recall of the latent images stored in the latter in the manner described above. The stimulated emission from the photomnemonic element then impinges upon the sensitized medium 106 producing the exposure of same (image transfer). In this way the separate words of a typographical line are composed in alignment upon the sensitized medium.

When the entire group of photomnemonic elements have completed the above action, the member 96 is in such a position that a projection 110 of it engages member 111, the action of which is to reverse switch 112 which is of the "double throw" type. This event reverses motor 91 as can be seen from FIGURE 15. When this occurs, the reversed rotation of the shaft causes engagement of an overriding clutch 113 which causes rotation of pinion 114 which meshes with rack 115 on member 96 causing a quick return of same to its initial position. As the member 96 returns to its initial position, the swivel arm 97 engages member 99 which causes the switch 100 to be opened. Simultaneously, a projection 116 of member 96 engages member 111 to cause a second reversal of switch 112 restoring it to its initial polarity. The motion imparted to member 99 produces an actuation of element-aligning lever 117 which has been retracted by spring 118 during the above action. The function of this motion is to reverse or return the elements from their displacement caused by the justifying action. The same motion of member 99 causes an engagement of pawl 118a with ratchet 119 (see FIGURE 14) attached to shaft 120 causing a partial rotation of toothed cylinder 121 which indexes the film or sensitized medium 106 to position it for the next line of typography. As the film is exposed it is unrolled from feed roll 122 and is fed into drum 123 which can be removed to the darkroom for development of the film after sufficient copy has been set.

As successive groups of photomnemonic elements occur the elements will be displaced forward to a position under the infrared source lamps 124, 124', 124'', the radiation from which is reflected downward through an infrared transmitting filter 126 by a reflector 125. This radiation serves to erase any residual image remaining on the photomnemonic elements (element preparation stage). After passing through this position the separate elements fall through a slot 127 onto the tilted magazine floor 128 where they slide downward into position for recycling.

It will be seen that many parts of an obvious nature such as optical adjustments, etc., occur in the drawings but are not referred to by number in this explanation.

The addition to the apparatus of some means of applying a potential to the photomnemonic elements (such as a contact strip, etc.) would permit the use of elements of the types shown in FIGURES 5 and 6. In case the elements of FIGURE 6 are used it would also be necessary to either invert the element or invert the image-recalling and transferring assembly of the apparatus shown unless, as has been suggested above, the functions of image storage and electroluminescence are combined in a single phosphor layer. The addition of auxiliary apparatus for applying a charge, pigment dusting and electrostatic transfer such as is well known to the art of xerography would enable the use of a zerographic element such as is described in FIGURE 4.

I claim as my invention:

1. A method of composing print using temporary print storage elements, comprising forming word images on a plurality of separate storage elements arranged in successive parallel relationship in order of occurrence of the respective words, with each word image commencing substantially immediately to the right of the word image preceding it in a progression equalling the desired line composition length less a deficiency, justifying such line composition of word images by displacing the end word image element to index the word image thereon to the line-end point and displacing the succeeding elements by progressively lesser amounts so as to space out the word images in the line being composed, and photographically transferring such justified line composition of word images successively onto a permanent retaining medium in direct alignment thereon to form a justified printing line.

2. A method of photocomposing print using a photomnemonic medium, comprising forming word images actinistically on a photomnemonic medium in successive parallel-line, successively offset relationship thereon in order of occurrence of the respective words, with each word image commencing in its own line and offset substantially immediately to the right of the word image preceding it in a progression differing from the desired line composition length, justifying such line composition of word images by displacing the succeeding word images by progressively different amounts so as to space out the word images in the line being composed, and photographically transferring such justified line composition of word images successively into a permanent retaining medium in direct alignment thereon to form a justified printing line.

3. Photocomposing apparatus for typographic production comprising a plurality of elongated strip elements having photomnemonic surfaces thereon to store type images, means supporting said elements in side-by-side parallel relationship and guiding the same for movement lengthwise relatively, means to project individual word images on the respective elements by light actinic to said surfaces, justifying means operative on said elements to vary the spacing of said word images to justify a line composition thereof to required length, said justifying means effecting relative longitudinal displacement of such elements, means energizing said surfaces to recall said justified line composition of stored images, and means to photograph said recalled images on a permanent retaining medium, including means effecting advance of the elements successively to advance the individual word images one after another into and past a field of view, and means to photograph each word image entering such field of view.

4. Photocomposing apparatus for typographic production comprising photomnemonic surface means to store type images, a source of light actinic to said surface, means to project onto said surface means type images in light from said source to form word images thereon, justifying means operative on said surface means to vary the spacing of said word images to justify a line composition thereof to required length, and means to convert said recalled images into a permanently retained form, said justifying means comprising an elongated member simultaneously engageable with sections of said surface means to permit shifting the same endwise, and means supporting and guiding said elongated member to permit moving the same in an angular manner to shift sections of said surface means by different relative amounts.

5. Photocomposing apparatus for typographic production comprising a plurality of strip elements having surfaces adapted to store word images thereon, means supporting said elements in side-by-side parallel relationship and guiding the same for movement lengthwise relatively, means to form individual word images on the respective elements, justifying means operative on said elements to vary the spacing of said word images to justify a line composition thereof to required length, said justifying means effecting relative longitudinal displacement of such elements, means to present said elements with word images thereon one after another into and past a field of view to be photographed, and means to photograph each word image entering such field of view.

6. A method of composing print using temporary print storage elements, comprising forming word images on a plurality of separate storage elements arranged in successive parallel relationship in order of occurrence of the respective words, with each word image commencing substantially immediately to the right of the word image preceding it in a progression equalling the desired line composition length less a deficiency, justifying such line composition of word images by displacing the end word image element to index the word image thereon to the line-end point and displacing the succeeding elements by progressively lesser amounts so as to space out the word images in the line being composed, and transferring such justified line composition of word image successively onto a permanent retaining medium in direct alignment thereon to form a justified printing line.

References Cited in the file of this patent

UNITED STATES PATENTS

| | | |
|---|---|---|
| 1,093,831 | Cornwall | Apr. 21, 1914 |
| 2,190,188 | Landsiedel | Feb. 13, 1940 |
| 2,603,418 | Ferguson | July 15, 1952 |
| 2,624,798 | Dinga | Jan. 6, 1953 |
| 2,685,830 | Robins | Aug. 10, 1954 |
| 2,921,513 | Frantz | Jan. 19, 1960 |
| 2,989,636 | Lieb | June 20, 1961 |

FOREIGN PATENTS

| | | |
|---|---|---|
| 1,062,021 | France | Dec. 2, 1953 |

OTHER REFERENCES

Journal of the Optical Society of America, vol. 36, No. 7, July 1946, page 382.